US011331987B1

(12) United States Patent
Cordes

(10) Patent No.: US 11,331,987 B1
(45) Date of Patent: May 17, 2022

(54) VEHICLE DOOR ASSEMBLY

(71) Applicant: Nissan North America, Inc., Franklin, TN (US)

(72) Inventor: Luke Cordes, Bloomfield Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/163,134

(22) Filed: Jan. 29, 2021

(51) Int. Cl.
*B60J 5/04* (2006.01)
*B62D 65/06* (2006.01)
*B62D 25/04* (2006.01)
*E05D 3/02* (2006.01)

(52) U.S. Cl.
CPC ........... *B60J 5/0443* (2013.01); *B60J 5/0413* (2013.01); *B60J 5/0415* (2013.01); *B60J 5/0431* (2013.01); *B60J 5/0437* (2013.01); *B62D 25/04* (2013.01); *B62D 65/06* (2013.01); *E05D 3/02* (2013.01); *E05Y 2600/46* (2013.01); *E05Y 2600/56* (2013.01); *E05Y 2600/61* (2013.01); *E05Y 2900/531* (2013.01)

(58) Field of Classification Search
CPC .............................. B60J 5/0443; B60J 5/0431
USPC ........................................... 296/146.5, 146.6
See application file for complete search history.

(56) References Cited

U.S. PATENT DOCUMENTS 4,850,636 A * 7/1989 McLaren ............... B60J 5/0437 296/146.5
5,908,216 A * 6/1999 Townsend ............. B60J 5/0452 296/146.6
6,135,537 A * 10/2000 Giddons ............... B60J 5/0431 296/146.6

* cited by examiner

*Primary Examiner* — Joseph D. Pape
(74) *Attorney, Agent, or Firm* — Global IP Counselors, LLP

(57) ABSTRACT

A vehicle door assembly include an inner door panel, a first hinge and a guard beam. The inner door panel has a first edge portion and a second edge portion. The first edge portion has a first hinge attachment location and a second hinge attachment location with the first hinge location having a first opening and a second opening. The first hinge is dimensioned and configured to attach to the first hinge attachment location of the inner door panel. The guard beam has a first end and a second end. The first end has a first fastener and a second fastener rigidly and non-movably attached thereto. The first fastener is inserted through the first opening and the second fastener extends through the second opening in the first hinge attachment location, the first and second fasteners further fastening to the first hinge thereby attaching the first hinge to the door panel.

20 Claims, 9 Drawing Sheets

VEHICLE DOOR ASSEMBLY

BACKGROUND

Field of the Invention

The present invention generally relates to a vehicle door assembly. More specifically, the present invention relates to a vehicle door assembly that includes a guard beam that is attached to an inner door panel and a hinge of the door assembly.

Background Information

Vehicle doors are continually being re-designed and altered in order to make them stronger and resist deformation during an impact event.

SUMMARY

One object of the present disclosure is to provide a vehicle door assembly with a guard beam that attaches to an inner door panel and further attaches to a door hinge.

In view of the state of the known technology, one aspect of the present disclosure is to provide a vehicle door assembly with an inner door panel, a first hinge and a guard beam. The inner door panel has a first edge portion and a second edge portion. The first edge portion has a first hinge attachment location and a second hinge attachment location with the first hinge location having a first opening and a second opening. The first hinge is dimensioned and configured to attach to the first hinge attachment location of the inner door panel. The guard beam has a first end and a second end. The first end has a first fastener and a second fastener rigidly and non-movably attached thereto. The first fastener is inserted through the first opening and the second fastener extends through the second opening in the first hinge attachment location, the first and second fasteners further fastening to the first hinge thereby attaching the first hinge to the door panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
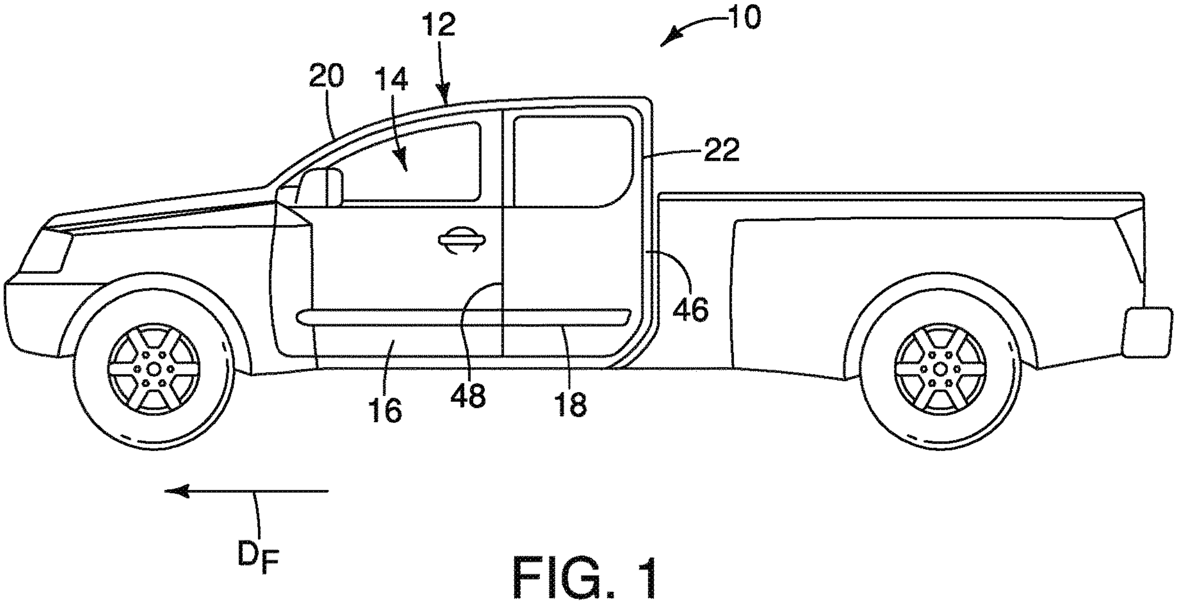
FIG. 1 is a side view of a vehicle having a door assembly shown in a closed orientation in accordance with a first embodiment.
Figure 2:
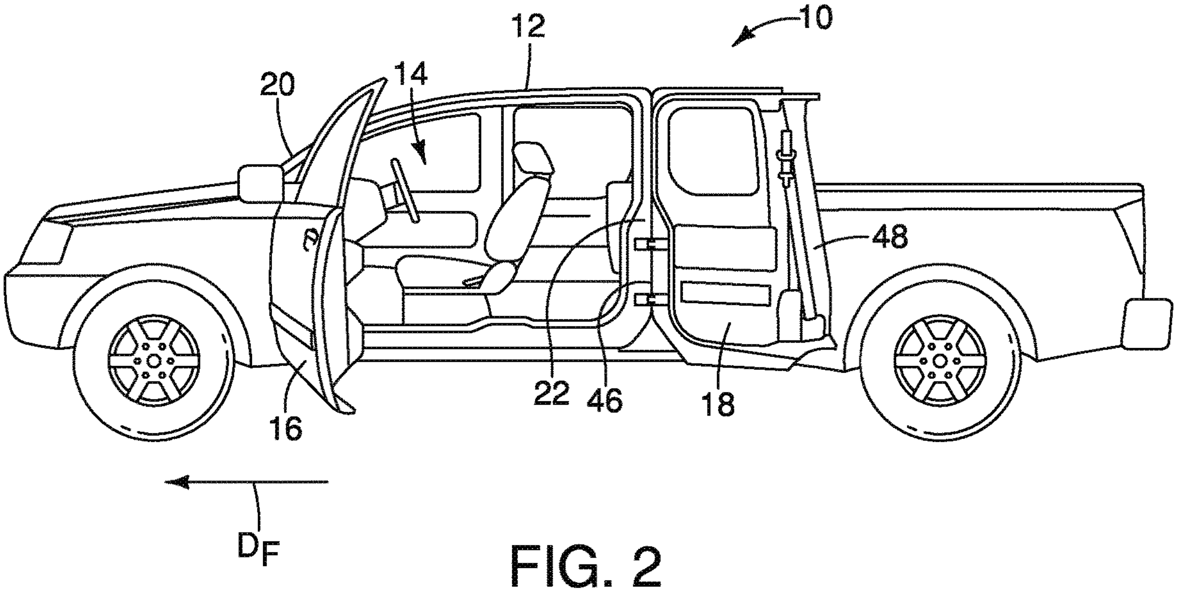
FIG. 2 is another side view of the vehicle showing the door assembly in an open orientation in accordance with the first embodiment.
Figure 3:
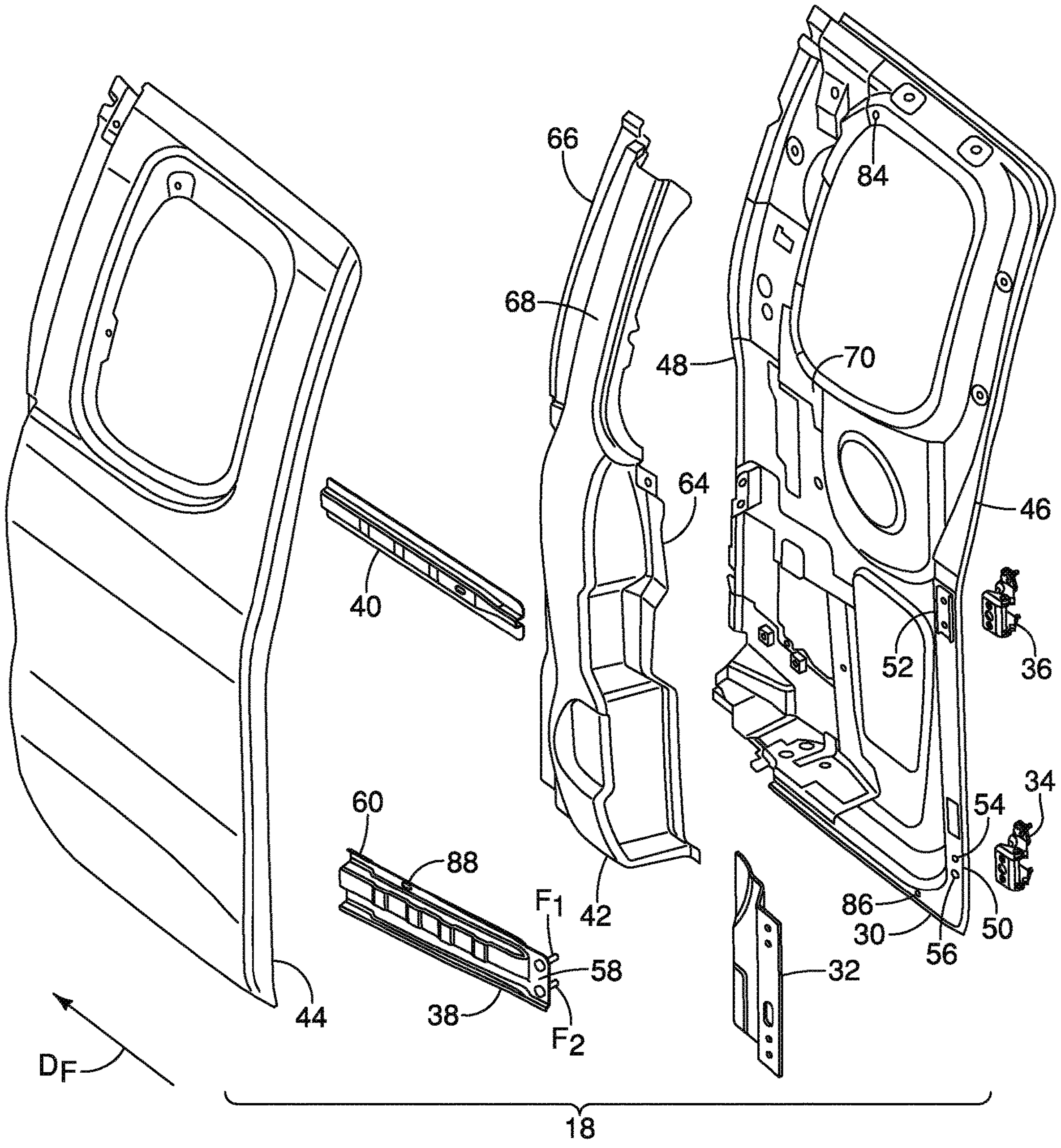
FIG. 3 is an exploded perspective view of the door assembly removed from the vehicle showing an inner door panel, a pillar panel, a reinforcement panel, a stiffener, a guard beam, a first hinge, a second hinge and an outer door panel in accordance with the first embodiment.
Figure 4:
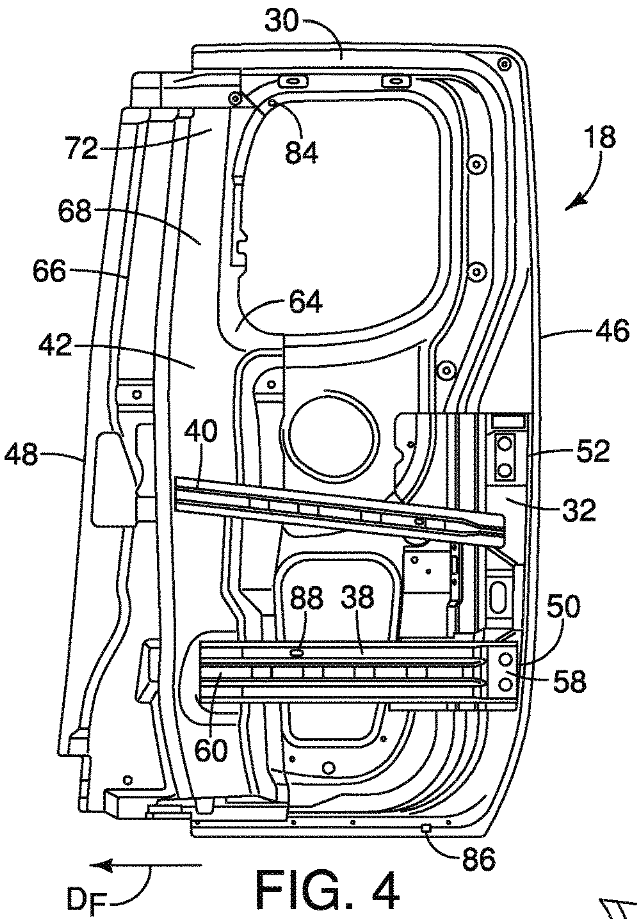
FIG. 4 is a plan view of the door assembly with the outer door panel removed showing the pillar panel, the stiffener, the reinforcement panel and the guard beam attached to the inner door panel in accordance with the first embodiment.
Figure 5:
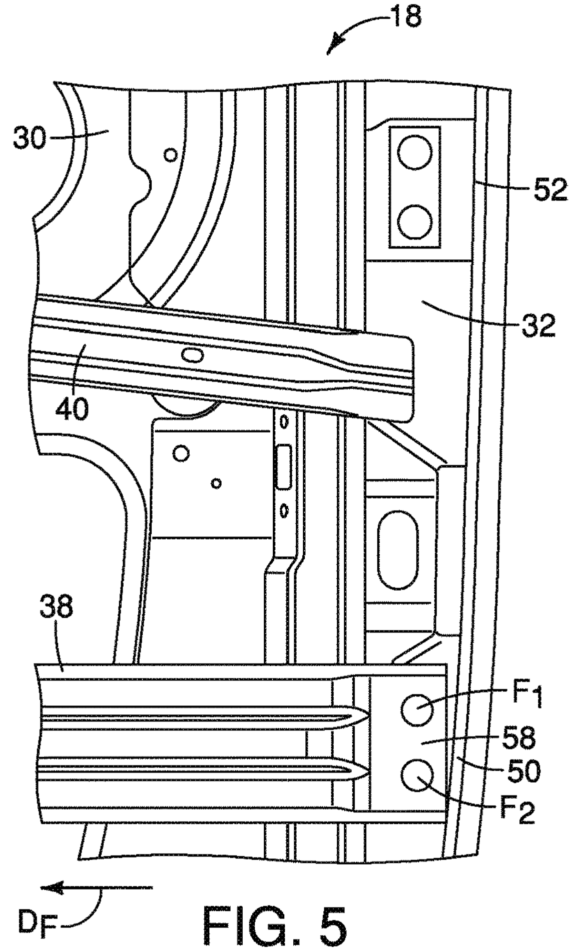
FIG. 5 is a plan view of a lower corner portion of the door assembly with the outer door panel removed showing fasteners fixedly attached to the guard beam in accordance with the first embodiment.

Referring initially to FIGS. 1 and 2, a vehicle 10 is illustrated in accordance with a first embodiment. The vehicle 10 includes a vehicle body structure 12 that defines a passenger compartment 14 that is accessed by front doors 16 and rear doors 18. Only one front door 16 and only one rear door 18 are shown in FIGS. 1 and 2. Since front doors are typically included on both sides of a vehicle, description of only one of the front doors 16 is provided below for the sake of brevity. Further, the depicted rear door 18 will be described herein below and its description applies equally to both rear doors 18.

The front door 16 and the rear door 18 are configured such that they cover the depicted side of the passenger compartment 14 when in the closed orientation shown in FIG. 1. With the front door 16 and the rear door 18 in their respective open orientations as shown in FIG. 2, the passenger compartment 14 is accessible and can be entered or exited from.

The vehicle body structure 12 includes an A-pillar 20 adjacent to a forward end of the front door 16 and a C-pillar 22 adjacent to a rearward end of the rear door 18. The vehicle body structure 12 itself does not include a B-pillar. However, as is described in greater detail below, the rear door 18 includes panels that define pillar structure that serves as a B-pillar with the rear door 18 in the closed orientation. Hence, the rear pillar of the vehicle body structure 12 is referred to herein below as the C-pillar 22 due to the presence of the pillar structure within the rear door 18. The vehicle 10 and vehicle body structure 12 define a vehicle forward direction DF, as shown in FIGS. 1 and 2. The vehicle forward direction DF is shown in various other figures showing only elements of the rear door 18. The inclusion of the vehicle forward direction DF in these drawings assumes the elements of the rear door 18 are in the closed orientation and provides an orientation relative to the vehicle 10.

A description of the rear door 18 (also referred to herein below as a vehicle door assembly 18) is now provided with reference to FIGS. 3-15.

The rear door 18 includes at least an inner door panel 30, a reinforcement panel 32, a first hinge 34, a second hinge 36, a guard beam 38, a stiffener 40, a pillar panel 42 and an outer door panel 44. The rear door 18 also includes various elements and components that are not shown, such as a window regulator, window glass, lock mechanism, latch mechanism and latch operating handle. Since these elements and components are conventional features, further description of these non-depicted elements and components is omitted for the sake of brevity.

As shown in FIGS. 1 and 2, the front door 16 includes hinges at a forward edge thereof such that a rearward end of the front door 16 is pivoted outward and forward relative to the vehicle body structure 12 when moved from the closed orientation to the open orientation. The rear door 18, on the other hand, includes the first and second hinges 34 and 36 at a rearward edge thereof such that a forward end of the rear door 18 is pivoted outward and rearward relative to the vehicle body structure 12 when moved from the closed orientation to the open orientation.

Figure 6:
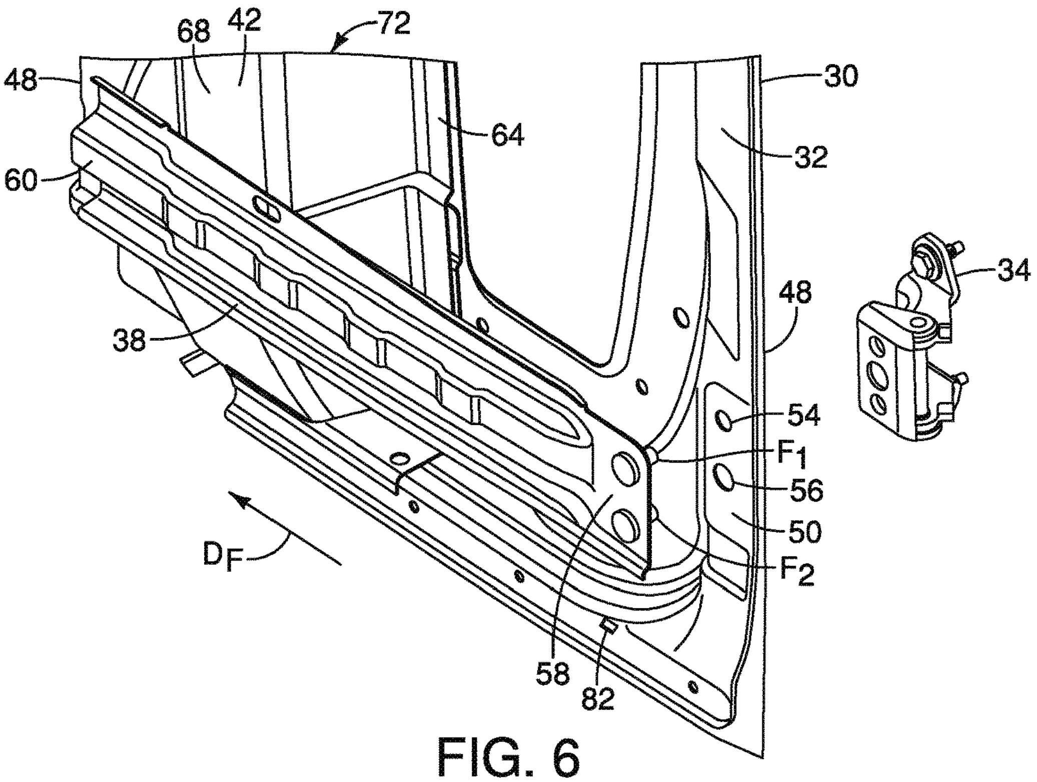
FIG. 6 is an exploded perspective view of the lower corner portion of the door assembly depicted in FIG. 5 showing the fasteners of the guard beam aligned with a first and second opening in the inner door panel and the first hinge in accordance with the first embodiment.
Figure 11:
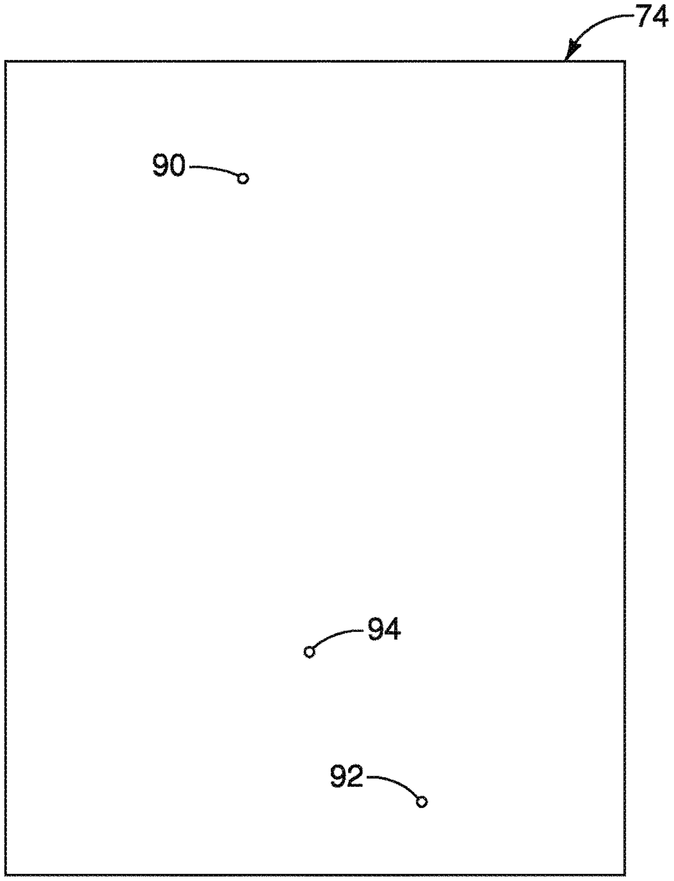
FIG. 11 is a plan view of a fixture used during the assembling process of the door assembly having a first locating pin, a second locating pin and a third locating pin in accordance with the first embodiment.

The inner door panel 30 of the rear door 18 has a first edge portion 46 (a rearward edge) and a second edge portion 48 (a forward edge). The first edge portion 46 has a first hinge attachment location 50 and a second hinge attachment location 52 located above the first hinge attachment location 50. As shown in FIGS. 6 and 11, the first hinge location 50 having a first opening 54 and a second opening 56. The first opening 54 at the first hinge location 50 of the inner door panel 30 defines a first diameter and is dimensioned with tight tolerances, as is described in greater detail below. The second opening 56 defines a second diameter that is larger than the first diameter of the first opening 54. Since the second diameter is larger than the first diameter, the second opening 56 at the first hinge location 50 of the inner door panel 30 is dimensioned with loose tolerances, as compared to the tolerances of the first opening 54, as is described in greater detail below.

As used herein, a manufactured product or machined element can include features that are dimensioned or position within a predetermined tolerance. The word tolerance is taken to mean the maximum acceptable level of deviation of a feature of an article of manufacture from its specification, measurements or standards. Basically, products with tight tolerances have extremely strict design parameters and hence, small values of tolerance. Products with loose tolerances have less extreme design parameters and hence have large values of tolerances.

The reinforcement panel 32 is welded or otherwise rigidly fixed to a lower rearward portion of the inner door panel 30 thereby reinforcing the areas of the first hinge attachment location 50 and the second hinge attachment location 52, as shown in FIGS. 3-10.

As shown in FIGS. 3 and 6-9, the first hinge 34 (also referred to herein as the first hinge 34) is dimensioned and configured to attach to the first hinge attachment location 50 of the inner door panel 30, as is described in greater detail below. Similarly, the second hinge 36 (also referred to herein as the second hinge 36) is attached to the second hinge attachment location 52 of the door panel 30 in alignment with the first hinge 34. Since the second hinge attachment location 52 is above the first hinge attachment location 50, the second hinge 36 is likewise located above the first hinge 34.

As shown in FIGS. 3-7 and 9, the guard beam 38 has a first end 58 (a hinge end) and a second end 60 (a forward end). The first end 58 includes a first fastener $F_1$ and a second fastener $F_2$ that are both rigidly and non-movably attached thereto.

The first and second fasteners $F_1$ and $F_2$ are preferably identical and have threaded shafts with the same diameter. The first and second fasteners $F_1$ and $F_2$ are preferably rigidly fitted to the first end of the guard beam 58. For example, the first and second fasteners $F_1$ and $F_2$ can be press-fitted into openings (not visible) at the first end of the guard beam 58, or, can be welded in position.

During assembly of the rear door 18, the first fastener $F_1$ is inserted into and extends through the first opening 54. Similarly, the second fastener $F_2$ is inserted into and extend through the second opening 56 in the first hinge attachment location 50. The first and second fasteners $F_1$ and $F_2$ further extend through opening in the first hinge 34 thereby attaching the first hinge 34 to the door panel 18.

As mentioned above, the first opening 54 at the first hinge location 50 of the inner door panel 30 is dimensioned with tight tolerances such that the first fastener $F_1$ extends therethrough and can only undergo limited movement relative to the first opening $F_1$ within the tight tolerances during installation of the guard beam 38 to the inner door panel 30. Specifically, the first diameter of first opening 54 is preferably no more than 5 percent of the outer diameter of the threaded shaft of the first fastener $F_1$ but is preferably approximately 2 percent of the outer diameter of the threaded shaft of the first fastener $F_1$. Consequently, once the first fastener $F_1$ is installed in the first opening 54, the guard beam 38 can basically pivot about an axis defined at the center of the first opening 54 but cannot undergo any appreciable amount of vertical or horizontal movement relative to the remainder of the inner door panel 30.

Further, the second opening 56 at the first hinge location 50 of the inner door panel 30 is dimensioned with the second diameter larger than the first diameter and therefore has looser tolerances. Specifically, the second diameter of the second opening 56 is preferably greater than 10 percent of the outer diameter of the second fastener $F_2$ and can be up to 30 percent of the outer diameter of the second fastener $F_2$. Consequently, with the second fastener $F_2$ extending through the second opening 56, the second fastener $F_2$ and the guard beam 38 can undergo pivoting movement within the confines of the second opening 56 about the first opening 54 with the first fastener $F_1$ being confined within the first opening 54. More specifically, the second fastener $F_2$ can move within the dimensions of the second opening 56 such that the guard beam 38 can pivot about the first fastener $F_1$ within the first opening 54. In other words, the loose tolerances of the second opening 56 allow for limited pivoting movement of the guard beam 38 about the first opening 54 during installation of the guard beam 38 to the inner door panel 30 in order to position the guard beam 38 (and consequently the first hinge 34) in a predetermined orientation relative to the inner door panel 30. In one embodiment, the guard beam 38 is preferably positioned in alignment with the first edge portion 46 of the inner door panel 30, as is described further below.

The pillar panel 42 is a vertically oriented panel that includes a first attachment flange 64, a second attachment flange 66 and a contoured section 68 therebetween. The first attachment flange 64 is attached to the inner door panel 30 at a vertical section 70 adjacent to a vertical central portion of the inner door panel 30, preferably via welding techniques. The second attachment flange 66 of the pillar panel 42 is fixedly attached to the second edge portion 52 of the inner door panel 30 such that an area of inner door panel 30 located between the second edge portion 48 and the section 70 along with the contoured section 68 of the pillar panel 42 define a hollow B-pillar structure 72. While the hollow B-pillar structure 72 is not a B-pillar per se, the hollow B-pillar structure 72 serves as a B-pillar to the vehicle body structure 12 with the rear door 18 in the closed orientation.

The pillar panel 42 is welded to the inner door panel 30 prior to the installation of the guard beam 38. After the first end 58 of the guard beam 38 is fastened to the first hinge attachment location 50 and the first hinge 34, the second end 60 of the guard beam 38 is pivoted slightly about the first fastener $F_1$ and the first opening 54 until it is positioned in a predetermined alignment orientation with the inner door panel 30, as is further described below. Thereafter, the second end 60 is welded to the pillar panel 42. It should be understood that once the pillar panel 42 is welded to the inner door panel 30, the pillar panel 42 is now a fixed part of the inner door panel 30 defining the hollow B-pillar structure 72. Therefore, the pillar panel 42 is part of the inner door panel 30.

The stiffener 40 is further welded to an area adjacent to the first edge portion 46 of the inner door panel 30 and to the pillar panel 42 above the guard beam 38, as shown in FIGS. 4-5 and 12-14.

After the inner door panel 30, the pillar panel 30, the stiffener 40 and the guard beam 38 are all fixedly attached to one another, the outer door panel 44 is attached to the inner door panel 30 covering and concealing the reinforcement panel 32, the guard beam 38, the stiffener 40 and the pillar panel 42. The outer door panel 44 can be, for example, welded to the first edge portion 46 and the second edge portion 48 of the inner door panel 30. The outer door panel 44 can further be welded or otherwise fixed to upper and lower edges of the inner door panel 30.

A description of part of the method for assembling the rear door 18 and aligning the guard beam 38 with the inner door panel 30 in the predetermined orientation is now provided with specific reference to FIGS. 11-15.

As shown in FIG. 11, an assembly table or fixture 74 is fitted with at least a first pin 90, a second pin 92 and a third pin 94. The first, second and third pins 90, 92 and 94 are installed to the fixture 74 at predetermined locations within predetermined tolerances in order to be in alignment locations that correspond to features on the rear door 18. The first pin 90 and the second pin 92 are also referred to herein below as door panel locating pins 90 and 92.

Figure 12:
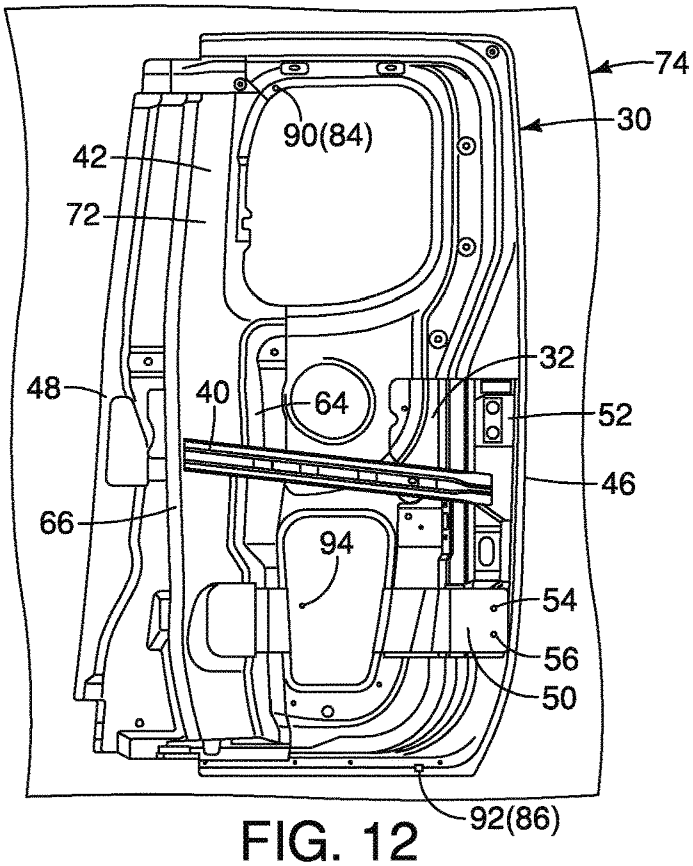
FIG. 12 is another plan view of the fixture showing the inner door panel on the fixture with the first and second locating pins extending through alignment holes in the inner door panel retaining the inner door panel in a predetermined orientation in accordance with the first embodiment.

As shown in FIG. 12, the inner door panel 30 is laid upon or against the fixture 74 such that the first pin 90 is inserted into a first alignment hole 84 and the second pin 92 is inserted into a second alignment hole 86 in the inner door panel 30. The first opening 54 in the first hinge attachment location 50 of the inner door panel 30 is positioned and dimensioned with tight tolerances relative to the first alignment hole 84 and the second alignment hole 86. Hence, the position of the first opening 54 relative to the third pin 94 is also within tight tolerances.

Hence, the fixture 74 provided with the first and second pins 90 and 92 (door panel locating pins) can receive the inner door panel 30 and retain the inner door panel 30 in a predetermined orientation relative to the third pin 94. Specifically, as shown in FIG. 12, the inner door panel 30 is positioned on the fixture 74 such that the first and second pins 90 and 92 (the door panel locating pins) fit into corresponding ones of the first and second alignment holes 84 and 86, thereby positioning the inner door panel 30 at a predetermined orientation relative to the third pin 94 (the guard beam retaining pin).

During the manufacturing of the inner door panel 30, the inner door panel 30 is provided with the first alignment hole 84, the second alignment hole 86, the first opening 54 and the second opening 56. The first and second alignment holes 84 and 86 and first opening 54 are precisely positioned at predetermined locations relative to one another during the manufacturing process. Consequently, the inner door panel 30 is positioned on the fixture 74 in a predetermined orientation for assembly purposes with the first opening 54 being similarly precisely located. As well, the guard beam 38 is provided with the first and second fasteners $F_1$ and $F_2$ and a third alignment hole 88. The third alignment hole 88 is a slot that extends in a generally horizontal direction. The vertical width of the third alignment hole 88 is determined with very tight tolerances, as is further explained below. However, the horizontal length of the third hole 88 is provided with a loose tolerance with respect to the third pin 94. The third hole 88 is located in a predetermined location in order to prevent pivoting movement of the guard beam 38 about the first opening 54. Therefore, the vertical width of the third hole 88 is predetermined to be approximately equal to the diameter of the third pin 84.

Figure 9:
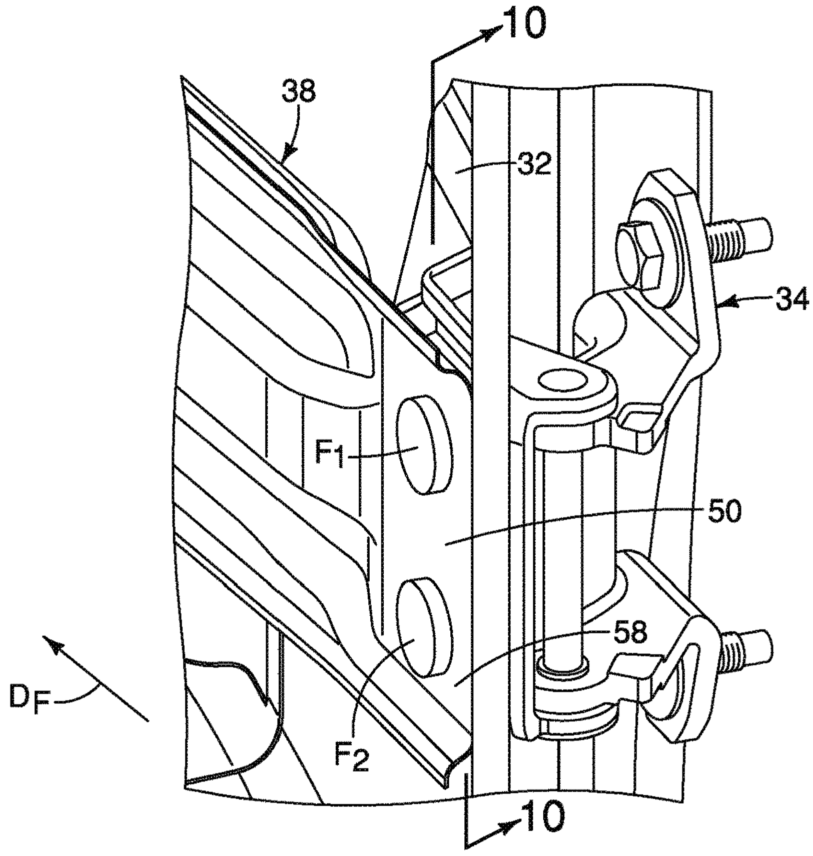
FIG. 9 is a perspective view of another area of the door assembly showing the first hinge attached to the door panel and the guard beam in accordance with the first embodiment.
Figure 10:
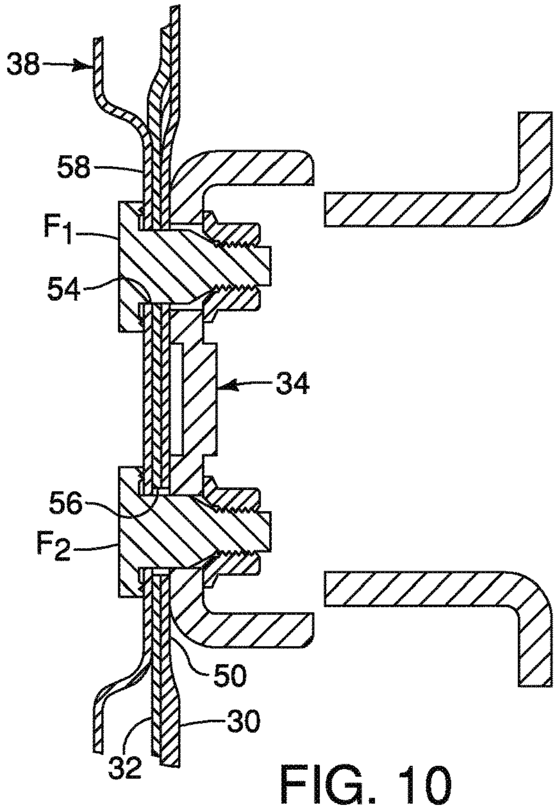
FIG. 10 is a cross-section of the door assembly taken along the line 10-10 in FIG. 9 showing the first hinge attached to the door panel and the guard beam in accordance with the first embodiment.
Figure 13:
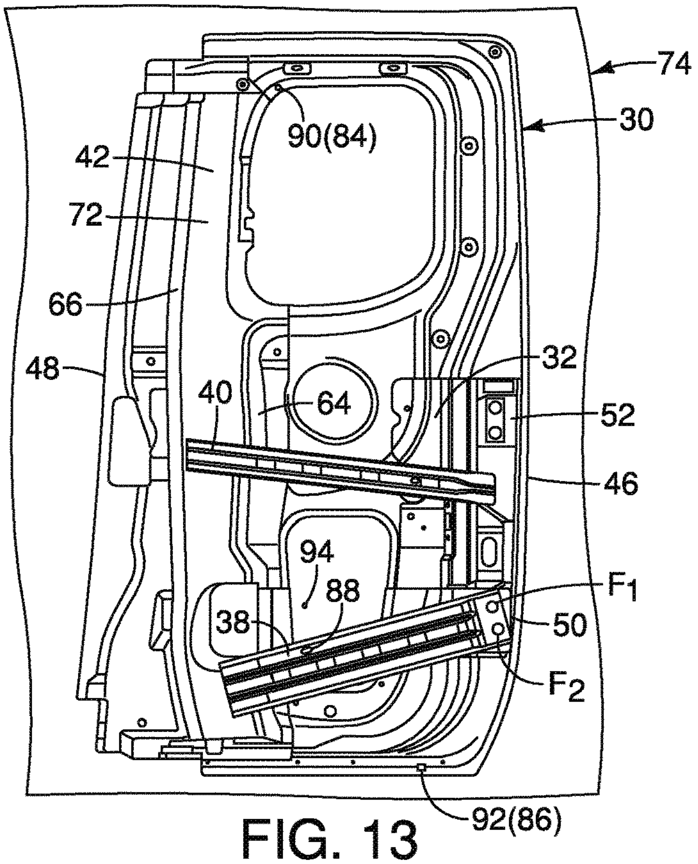
FIG. 13 is another plan view of the fixture similar to FIG. 12 showing the inner door panel and the guard beam on the fixture with fasteners of the guard beam inserted into openings in the inner door panel (and first hinge) in accordance with the first embodiment.

As shown in FIG. 13, the first end 58 of the guard beam 38 is installed to the first hinge attachment location 50 of the inner door panel 30. More specifically, the first fastener $F_1$ is inserted into the first opening 54 of first hinge attachment location 50 and can subsequently be inserted into one of the openings of the first hinge 34, as shown in FIGS. 9 and 10. Simultaneously, the second fastener $F_2$ is inserted into the second opening 56 of first hinge attachment location 50 and into the other of the openings of the first hinge 34.

With the first fastener $F_1$ inserted into the first opening 54 of the inner door panel 30, the first end 58 of the guard beam 38 is positioned a predetermined vertical orientation relative to the inner door panel 30. Since the first opening 54 has tight tolerances relative to the first fastener $F_1$ the first end 58 of the guard beam 38 cannot undergo vertical or horizontal movement relative to the first hinge attachment location 50 of the inner door panel 30. Prior to the second end 60 of the guard beam 38 being fixed in position, the guard beam 38 can only pivot about the first opening 54 with the first fastener $F_1$ extending through the first opening 54. At this point in time, rotation of the guard beam 38 is only limited to the tolerances of the second opening 56 relative to the second fastener $F_2$.

Figure 14:
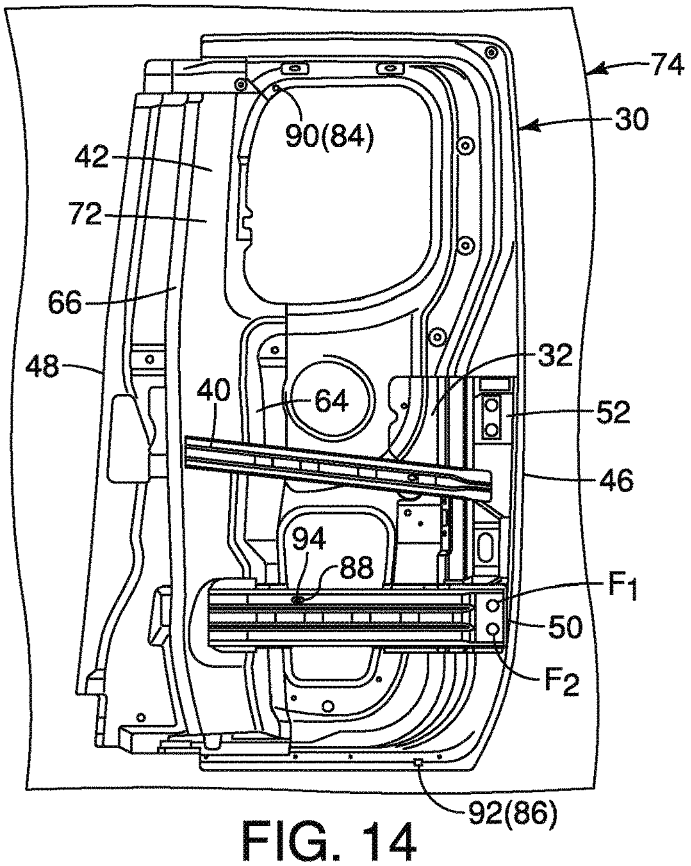
FIG. 14 is another plan view of the fixture similar to FIGS. 12 and 13 showing the inner door panel and the guard beam on the fixture with the guard beam moved to an orientation such that the third alignment pin is inserted into an alignment hole in the guard beam thereby positioning the guard beam (and the first hinge) in a predetermined orientation relative to the inner door panel in accordance with the first embodiment.

As shown in FIG. 14, the guard beam 38 is pivoted into a position where the third pin 94 (the guard beam alignment pin) aligns with the third alignment hole 88 of the guard beam 38 and inserted therein. As shown in FIG. 14, the guard beam 38 is now positioned at a predetermined orientation relative to the inner door panel 30 such that the first hinge 34 is also in a predetermined orientation relative to the first edge portion 46 of the inner door panel 30, the first hinge attachment location 50 and the second hinge attachment location 52. During pivoting movement of the guard beam 38 into alignment with the third pin 94, the second fastener $F_2$ is able to undergo movement within the second opening 56 at the first hinge location 50 of the inner door panel 30 because the second opening 56 has diameter that is larger than the second fastener $F_2$ (relative dimensions define loose tolerances).

Figure 7:
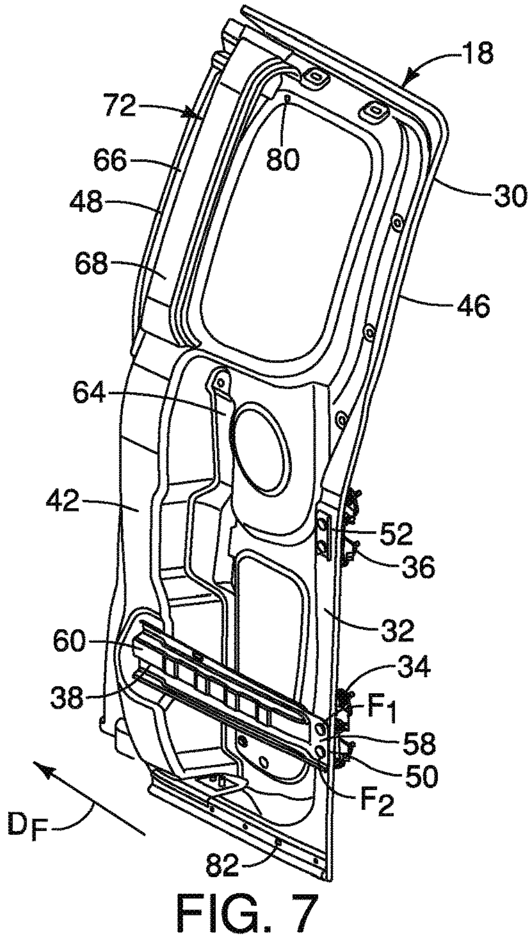
FIG. 7 is a perspective view of the door assembly showing the guard beam attached to the inner door panel and the first hinge in accordance with the first embodiment.
Figure 8:
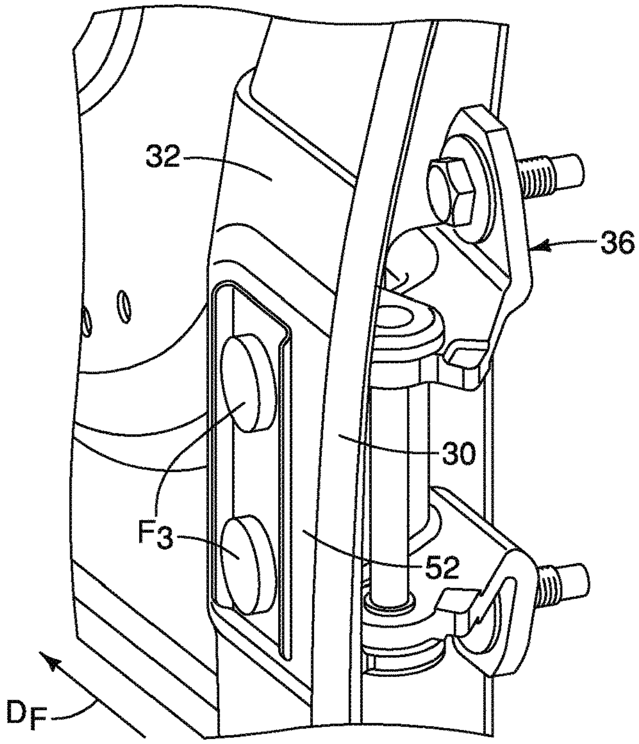
FIG. 8 is a perspective view of an area of the door assembly showing the second hinge attached to the door panel in accordance with the first embodiment.
Figure 15:
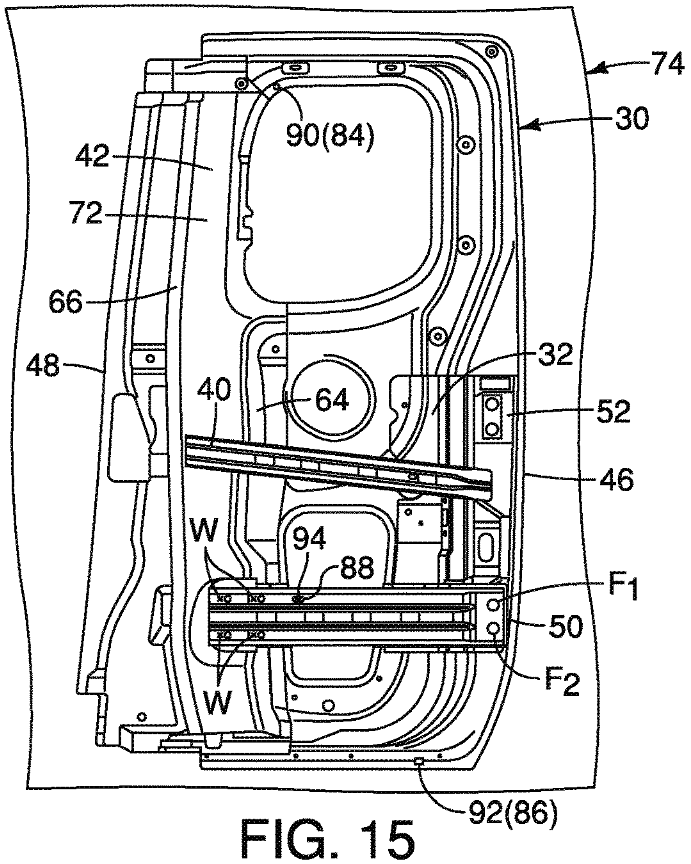
FIG. 15 is another plan view of the fixture similar to FIGS. 12-14 showing the guard beam in the predetermined orientation being welded to the inner door panel in accordance with the first embodiment.

As shown in FIG. 15, once the guard beam 38 is oriented and aligned with the third pin 94, the second end 60 of the guard beam 38 can be fixedly attached to the inner door panel 30. More specifically, the second end 60 of the guard beam 38 is welded or otherwise rigidly and non-movably fixed to the pillar panel 42 (the B-pillar panel) which is part of the inner door panel 30. Thereafter, the first hinge 34 can be fixed to the first and second fasteners $F_1$ and $F_2$ and hence the inner door panel 30 via fastener elements that threadably attach to the first and second fasteners $F_1$ and $F_2$ as shown in FIGS. 6, 7 and 10.

It should be understood from the drawings and the description herein that the stiffener 40 can be welded to the pillar panel 42 and inner door panel 30 proximate the first edge portion 46 before or after alignment and attachment of the guard beam 38 to the inner door panel 30 and the first hinge 34.

It should further be understood from the drawings and the description herein that the second hinge 36 can be attached to the second hinge attachment location 52 of the inner door panel 30 before or after installation of the guard beam 38 and the first hinge 34. Specifically, the second hinge 36 can be attached to the second hinge attachment location 52 of the inner door panel 30 via fasteners $F_3$. Openings in the second hinge attachment location 52 for the fasteners $F_3$ are provided with their own tight tolerances to ensure alignment between the first hinge 34 and the remainder of the inner door panel 30.

Second Embodiment

Figure 16:
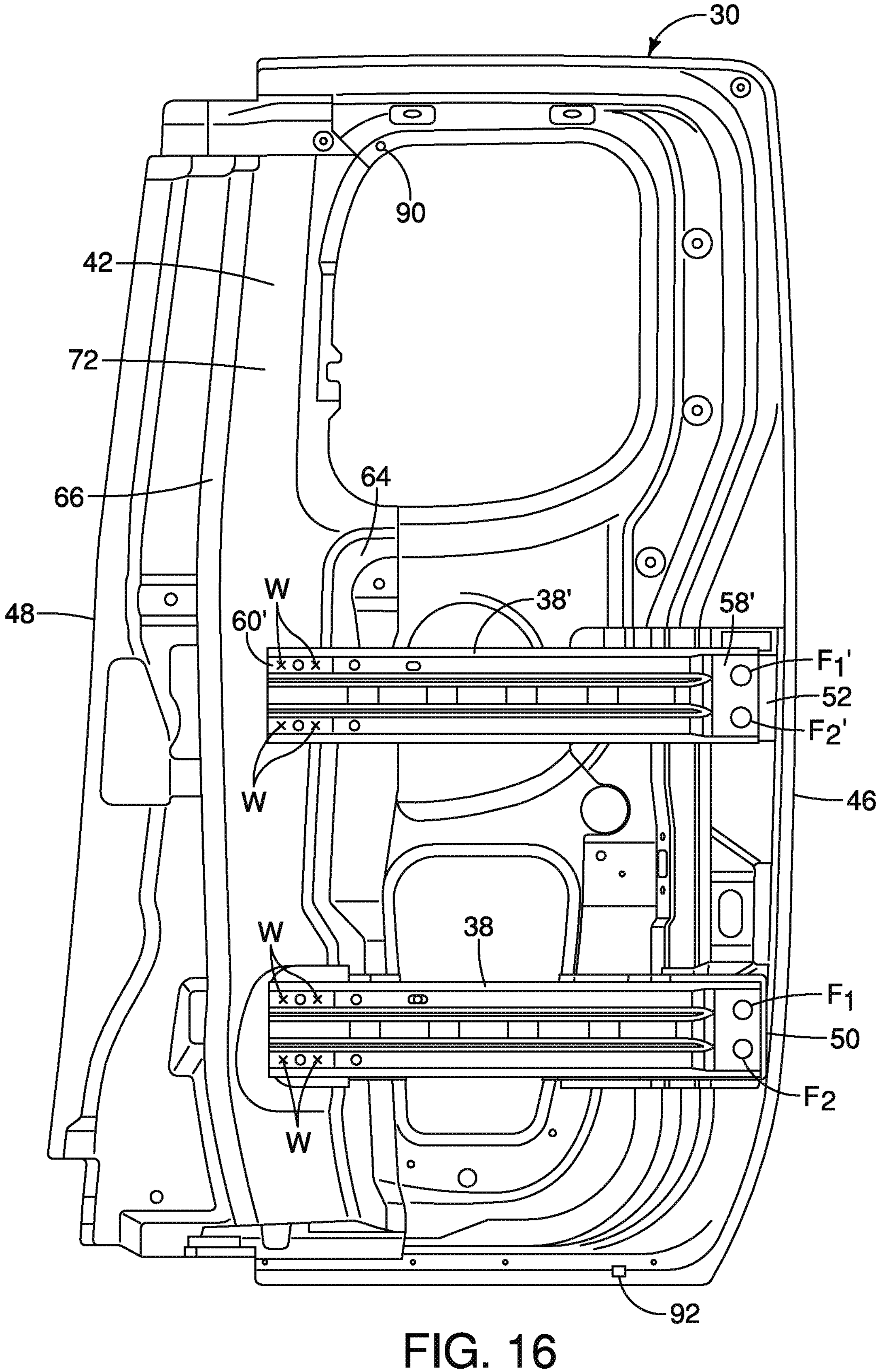
FIG. 16 is a plan view of the inner door panel with a second guard beam positioned in a predetermined orientation relative to the inner door panel with fasteners of the second guard beam extending to the second hinge thereby positioning the second hinge in a predetermined orientation relative to the inner door panel in accordance with a second embodiment.

Referring now to FIG. 16, the inner door panel 30 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The inner door panel 30 is basically the same as in the first embodiment and includes the guard beam 38 and the pillar panel 42 and other features described above with respect to the first embodiment. However, in the second embodiment, the stiffener 40 of the first embodiment has been omitted and replaced with another guard beam 40' that includes a first fasteners $F_1'$ and a second fastener $F_2'$ that are provided to fix the second hinge (not shown) to the inner door panel 30. The guard beam 40' is installed and aligned with the inner door panel 30 and the first hinge (not shown) in a manner similar the alignment and assembly process of the guard beam 38 described above with respect to the first embodiment.

It should be understood from the drawings and the description herein that in a further embodiment, the guard beam 38 can be omitted with the stiffener 40 replacing the guard beam 38. In this further embodiment, the guard beam 40' is included such that the second hinge is located below the first hinge, where the first hinge is secured to the guard beam 40' and the inner door panel at the second hinge attachment location 52.

The various vehicle door elements and components (other than the guard beam configuration described above) are conventional components that are well known in the art. Since such vehicle door elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts. Also as used herein to describe the above embodiments, the following directional terms "forward", "rearward", "above", "downward". "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising an inner door panel having a first edge portion and a second edge portion, the first edge portion having a first hinge attachment location and a second hinge attachment location, the first hinge location having a first opening and a second opening;

a first hinge dimensioned and configured to attach to the first hinge attachment location of the inner door panel; and a guard beam having a first end and a second end, the first end having a first fastener and a second fastener rigidly and non-movably attached thereto, the first fastener being inserted through the first opening and the second fastener extending through the second opening in the first hinge attachment location, the first and second fasteners further fastening to the first hinge thereby attaching the first hinge to the door panel, the second end of the guard beam being attached to the inner door panel proximate the second edge portion.

2. The vehicle door assembly according to claim 1, further comprising a second hinge attached to the second hinge attachment location of the door panel in alignment with the first hinge.

3. The vehicle door assembly according to claim 2, wherein the second hinge attachment location is above the first hinge attachment location such that the second hinge is located above the first hinge.

4. The vehicle door assembly according to claim 2, wherein the second hinge attachment location is below the first hinge attachment location such that the second hinge is located below the first hinge.

5. The vehicle door assembly according to claim 1, wherein the first edge portion of the inner door panel is located at a rearward end of the inner door panel and the second edge portion of the inner door panel is located at a forward end of the inner door panel.

6. The vehicle door assembly according to claim 1, wherein the first opening has a first diameter and the second opening has a second diameter larger than the first diameter.

7. The vehicle door assembly according to claim 6, wherein the first opening at the first hinge location of the inner door panel is dimensioned with tight tolerances such that the first fastener extending therethrough can undergo only limited movement relative to the first opening within the tight tolerances during installation of the guard beam to the inner door panel.

8. The vehicle door assembly according to claim 7, wherein the second end of the guard beam is fixedly attached to the inner door panel proximate the second edge portion subsequent to positioning of the guard beam and the first hinge in alignment with the first edge portion of the inner door panel.

9. The vehicle door assembly according to claim 1, wherein the inner door panel further comprises a pillar panel fixedly attached to at least the second edge portion of the inner door panel such that the inner door panel and the pillar panel define a B-pillar structure with the vehicle door assembly in a closed orientation on a vehicle.

10. The vehicle door assembly according to claim 9, further comprising an outer door panel attached to the inner door panel covering and concealing the guard beam and the pillar panel.

11. The vehicle door assembly according to claim 1, further comprising an outer door panel attached to the inner door panel covering and concealing the guard beam.

12. The vehicle door assembly according to claim 1, wherein the first fastener is press-fitted to the first end of the guard beam such that the first end of the guard beam can undergo rotational movement relative to the first opening during installation of the guard beam to the inner door panel.

13. The vehicle door assembly according to claim 12, wherein the guard beam further includes an alignment slot at a location closer to the second end than the first end of the guard beam, the alignment slot being positioned to align the guard beam with the inner door panel prior to the second end being welded to the inner door panel proximate the second edge portion of the inner door panel.

14. A method for assembling a vehicle door, comprising:

providing a fixture with door panel locating pins and a guard beam alignment pin, the door panel locating pins and the guard beam alignment pin being fixed to the fixture at predetermined locations;

positioning an inner door panel on the fixture such that the door panel locating pins engage the inner door panel thereby positioning the inner door panel at a predetermined orientation relative to the guard beam alignment pin, the inner door panel having a first edge portion and a second edge portion, the first edge portion having a first hinge attachment location that defines a first opening and a second opening;

providing a guard beam having a first end and a second end, the first end having a first fastener and a second fastener rigidly and non-movably attached thereto;

inserting the first fastener into the first opening and inserting the second fastener into the second opening in the first hinge attachment location;

aligning a portion of the guard beam with the guard beam alignment pin thereby positioning the guard beam at a predetermined orientation relative to the inner door panel; and non-movably fixing the second end of the guard beam to the inner door panel at a location proximate the second edge portion.

15. The method for assembling a vehicle door according to claim 14, wherein after non-movably fixing the second end of the guard beam to the inner door panel, a first hinge is installed at the first hinge attachment location of the inner door panel to the first and second fasteners such that the first hinge is in a predetermined orientation relative to the first edge portion of the door panel.

16. The method for assembling a vehicle door according to claim 14, wherein the first opening at the first hinge location of the inner door panel is dimensioned with tight tolerances such that the first fastener extending therethrough can undergo limited movement relative to the first opening within the tight tolerances during installation of the guard beam to the inner door panel.

17. The method for assembling a vehicle door according to claim 16, wherein the second opening at the first hinge location of the inner door panel is dimensioned with loose tolerances such that the second fastener extending therethrough can undergo greater movement relative to the second opening than the movement of the first fastener in the first opening movement, the movement of the second fastener being within the loose tolerances allowing for limited pivoting movement of the guard beam about the first opening during the aligning the portion of the guard beam with the guard beam alignment pin.

18. The method for assembling a vehicle door according to claim 14, further comprising fixedly attaching a pillar panel to the inner door panel proximate the second edge portion such that the inner door panel and the pillar panel define a B-pillar structure.

19. The method for assembling a vehicle door according to claim 18, wherein the non-movably fixing of the second end of the guard beam to the inner door panel includes welding the second end of the guard beam to the pillar panel.

20. The method for assembling a vehicle door according to claim 18, further comprising fixedly attaching an outer door panel to the inner door panel covering and concealing the guard beam and the pillar panel.

* * * * *